United States Patent [19]
Graham

[11] Patent Number: 6,149,844
[45] Date of Patent: *Nov. 21, 2000

[54] METHOD OF MANUFACTURING COMPOSITES

[75] Inventor: Neil Graham, Coogee, Australia

[73] Assignee: Decta Holdings Pty Ltd., Australia

[*] Notice: This patent issued on a continued prosecution application filed under 37 CFR 1.53(d), and is subject to the twenty year patent term provisions of 35 U.S.C. 154(a)(2).

[21] Appl. No.: 08/793,848

[22] PCT Filed: Sep. 11, 1995

[86] PCT No.: PCT/AU95/00593

§ 371 Date: Mar. 7, 1997

§ 102(e) Date: Mar. 7, 1997

[87] PCT Pub. No.: WO96/07532

PCT Pub. Date: Mar. 14, 1996

Related U.S. Application Data

[63] Continuation of application No. 08/793,848, Mar. 7, 1997, abandoned.

[30] Foreign Application Priority Data

Sep. 9, 1994 [AU] Australia ............................... PM 8027

[51] Int. Cl.[7] .................................................. B29C 70/42
[52] U.S. Cl. .......................... 264/71; 264/257; 264/258; 264/314; 425/112; 425/389; 425/432
[58] Field of Search ............................. 264/570, 71, 314, 264/316, 257, 258; 425/129.1, 432, 389, 394, 112

[56] References Cited

U.S. PATENT DOCUMENTS

| | | | |
|---|---|---|---|
| 4,148,597 | 4/1979 | Larsen | 425/389 |
| 4,190,484 | 2/1980 | Pohl | 156/580 |
| 4,808,362 | 2/1989 | Freeman | 234/314 |
| 5,464,337 | 11/1995 | Bernardon et al. | 264/257 |
| 5,578,158 | 11/1996 | Gutowski et al. | 264/258 |
| 5,643,522 | 7/1997 | Park | 264/258 |

FOREIGN PATENT DOCUMENTS

| | | | |
|---|---|---|---|
| 0 255 596 | 2/1988 | European Pat. Off. . | |
| 2 667 013 | 3/1992 | France . | |
| 2 673 571 | 9/1992 | France . | |
| 39 39 344 | of 1991 | Germany . | |
| 88-245727 | 7/1988 | Japan . | |
| 63-293039 | 11/1988 | Japan . | |
| 430 163 | of 1967 | Switzerland . | |
| 879769 | of 1961 | United Kingdom . | |
| 2 065 022 | 6/1981 | United Kingdom | 264/314 |
| 2 250 466 | 6/1992 | United Kingdom . | |
| 2 267 457 | 12/1993 | United Kingdom . | |
| WO94/04335 | of 1994 | WIPO . | |

*Primary Examiner*—Mathieu D. Vargot
*Attorney, Agent, or Firm*—Baker & Daniels

[57] ABSTRACT

A method and apparatus for the manufacture of a composite component by locating a composite lay-up between a mould surface and a backing surface, each surface forming a wall of a respective pressure chamber. Securing the chambers together to retain the lay-up therebetween with at least one of the said walls movable relative to the other, under the influence of pressure in the chamber incorporating the movable wall, to sandwich the composite therebetween. Then circulating fluid under pressure through each of the chambers at substantially the same pressure to compress the composite lay-up between said mould and backup surfaces to compact the composite lay-up. While the fluid is circulating elevating the temperature thereof to effect curing of the composite. One of the walls between which the composite lay-up is located is of a flexible or semi-rigid construction and the opposing surface of the other wall is shaped to impart to the composite the required surface contour in the product.

19 Claims, 5 Drawing Sheets

METHOD OF MANUFACTURING COMPOSITES

This is a continued prosecution of application Ser. No. 08/793,848, filed Mar. 7, 1997, now abandoned.

BACKGROUND OF THE INVENTION

1. Field of the Invention

This invention relates to a method of manufacturing composites wherein the bonding medium is a thermoplastic or thermocuring resin.

2. Description of Related Art

The term "composite" is a word in common usage in industry to identify a component or product produced by impregnating a fibrous material with a curing resin to form laminates or layers.

Such composites are well known and widely used in industry, particularly for the production of high strength, lightweight components such as components for the marine and aircraft industries. One of the requirements in manufacturing such composites is to expel all air and excess resin from within the composite so as to provide a complete bond between the respective components of the composite to achieve maximum strength and to minimise weight. Further to reduce manufacturing times and improve the products performance, it is customary to cure the component at an elevated temperature.

In currently employed manufacturing methods, it is common to use vacuum bags as a means of applying pressure to the composite to force air out of the interior thereof and remove excess resin. Also curing of the composite in an autoclave or the like effects additional compaction, and provides the ability to control the temperature to ensure complete curing and, in some situations, to accelerate curing. An alternative known technique is to use a conventional press, preferably with heated dies, to compress the elements of the composite and to accelerate curing.

Both an autoclave and a heated moulding presses each require substantial mechanical equipment to effect the curing operation, which can be a major cost and convenience factor, particularly in producing large size composites. Also metal moulds and autoclaves are very expensive in terms of capital cost, and particularly in the case of an autoclave is expensive to operate.

Resin transfer moulding is another known process for the production of composites but it does demand a high degree of accuracy and skill in the mould construction and in the implementation of the moulding process. Problems are experienced in obtaining accuracy in placement and distribution of the fibre and the resin within the mould. In attempting to deal with these problems it is commonly necessary to use special high flow resins and high quality fibre materials. These add to the product cost as also does the slow process times required for longer products.

BRIEF SUMMARY OF THE INVENTION

It is the object of the present invention to provide a method for the manufacture of composites which is effective in use to provide high production rates at reduced capital equipment outlay and operating cost, together with improved quality in the composite produced.

With this object in view, there is provided a method of manufacturing a composite component comprising locating a composite lay-up between a mould surface and a backing surface, each surface forming a wall of a respective pressure chamber, detachably securing the said chambers together to retain the lay-up between said mould and backing surfaces, at least one of the said walls being movable relative under the influence of said pressure to the other to sandwich the composite therebetween, and circulating fluid at an elevated temperature and pressure through each said chamber to compress the composite lay-up between said mould and backup surfaces to compact said composite lay-up and elevate the temperature thereof to effect curing.

The fluid circulated through the chambers is maintained at substantially the same pressure in each chamber so that the forces acting on the respective walls, between which the composite lay-up is located, are balanced. As a result of the balanced pressure the opposing walls forming the mould faces are not required to be of substantial strength, and hence mass, which would require substantial heat input to establish the required curing temperature of the composite lay-up therebetween. Also, as the walls can be of a relatively light construction and hence low mass, they can be heated and cooled quickly, with reduced use and loss of heat energy. Also, the total heat energy to carry out the curing, and the curing time, are both minimised. Further, as a result of the balanced pressure condition, and thus the balance forces on the opposing faces of the touching or adjoining walls of the two pressure chambers, there is no force promoting twisting or bending thereof. Therefore the walls of the chambers; between which the composite is located, are not required to be of substantial mechanical strength in order to maintain dimensional accuracy of the component produced from the lay-up, as is required in a conventional press used to produce composites under similar compaction.

Preferably, the movable wall or walls are of a basic rigid construction connected around the complete periphery thereof to the main structure of the chamber by a flexible member which, during relative movement, maintains a sealed relationship between the movable wall and the remainder of the chamber.

Preferably, one of the walls between which the composite is located is of a flexible or readily deformable character and the opposing surface of the other wall is shaped to impart to the composite the required surface contour in the finished product. Alternatively, the respective walls between which the composite is sandwiched may be respectively shaped to provide the required uniform or variable thickness of the finished composite. In the preferred form, one of the walls forming the surfaces between which the lay-up of the composite is sandwiched, is a rigid wall whilst the opposing wall is of a flexible nature thereby promoting the expulsion of air from within the composite lay-up and the distribution of the resin therein, allowing for variations in thickness of composite lay-up, and the expulsion of excess resin. This is achieved as a result of the above described arrangement providing a uniform pressure throughout the lay-up including where there are variations in lay-up thickness. There is thus the ability to obtain a uniform resin to fibre ratio throughout the lay-up. Excess resin is forced out of the lay-up into a bleeder cloth and excess air discharged either to atmosphere or to a vacuum vessel.

An advantage of the presently proposed use of circulating fluid as the heating and cooling medium is the ability to transfer heat rapidly and evenly to all areas of the lay-up being cured. The use of a liquid to convey the heat further allows more heat energy to be transferred more rapidly than would be available using a gas. For example, water is capable of providing approximately 4,200 times more heat energy than air at the same temperature from an equivalent volume, and an increase in transfer rates of approximately 22 times in comparison to air. This enables the resin to quickly heat up to a reduced viscosity and thereby to enable transfer of resin and expulsion of air to be achieved more quickly.

Another factor relevant to the use of a gas or liquid is the need to achieve even temperature to all areas of the composite. A lack of heat energy can occur in some areas, such as where the composite thickness is greatest and extra heat energy is required to obtain full curing. In contrast those areas of the composite with the least thickness, or that are more exposed may be over heated. It has been found that the use of a liquid circulating through an enclosed space as a heat source can be effectively channelled into restricted or confined areas to provide a more even temperature than is achievable with gas. With the high heat energy available from a liquid source, all areas of the composite are subject to a more constant temperature than would be the case with a less controllable gas source.

A significant disadvantage of the curing procedure using vacuum bags and autoclaves is that air trapped between laminates is difficult to remove or release. In the past it has been the practice to minimise the effect of the entrapped air by compressing the air bubble within the lay-up using a high pressure in an autoclave to minimise the area of the composite affected by the air bubble. Another approach has been to attempt to remove the bubble by alternately compressing and releasing the vacuum or pressure to release the bubble from between the layers of the composite lay-up. This has not proven in practice to be very practical because the bubble and the compressing medium are both compressible gases and little energy can be transferred to the gas bubble to cause its release. This approach can be contrasted with the use of an incompressible fluid such as water, as the transfer medium, as is proposed by the present method, which can transfer energy to the gas bubble by creating waves moving through the water or liquid which alternately compress and release the bubbles many times per second and bring about the breakdown thereof. This results in a minimum of number and size of voids left in the composite, due to the presence of entrapped air bubbles. With this process, compaction of the composite lay-up can be achieved at a low pressure without the need for the use of an autoclave.

Using the process as described hereinafter with reference to the accompanying drawings, an interrupter valve can be used to interrupt the flow of liquid around the circuit and thereby create a pressure wave effect placing the composite lay-up in a vibrating environment in a manner similar to the vibrators as used to release the air from a concrete pour. Alternately a sonic or ultrasonic vibrator may be attached to the mould whereby the mould is vibrated placing the lay-up in a vibrating environment. Alternately a piston pump could be employed in the circuit to alternately compress and release the fluid thus applying a pulsation to the composite lay-up. In yet a further alternative, a pressure valve could be employed to control the air to compress and release air in a chamber to create pressure pulses in the liquid system Thus vibrations of a high frequency such as of the order of ten cycles per second can be achieved.

BRIEF DESCRIPTION OF THE DRAWINGS

The invention will be more readily understood from the following description of respective practical embodiments of the method as illustrated in the accompanying drawings.

In the drawing

DETAILED DESCRIPTION OF THE INVENTION

Figure 1:
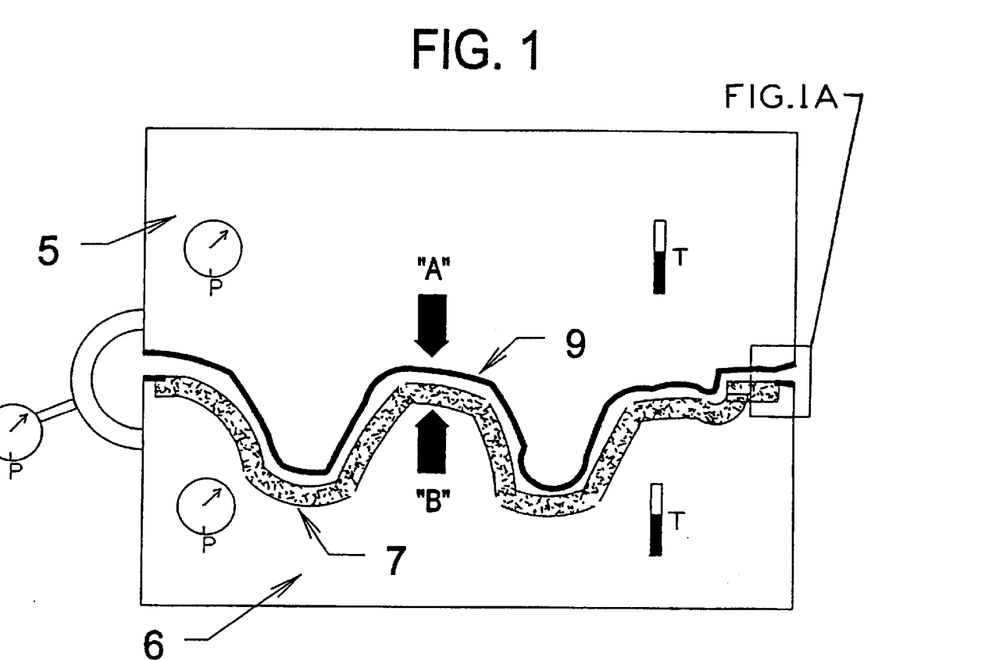
FIG. 1 is a diagrammatic representation of the mould structure, with FIG. 1A showing a close-up view.
Figure 1A:
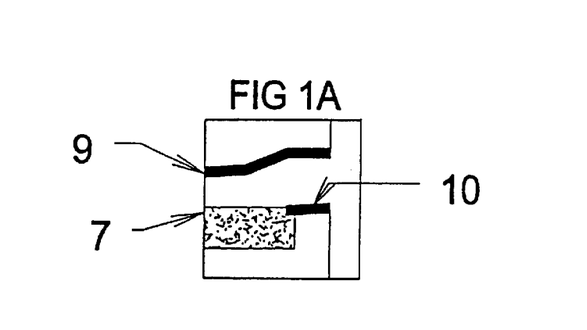

Referring now to FIG. 1, the two closed pressure chambers 5 and 6 are of a rigid construction, including provision (not shown) to enable the two chambers to be clamped together in a superimposed relation, preferably, by means of a clamp arrangement extending around the full periphery of the respective opposing upper walls 7 and 9 of the chambers. The wall 7 of the lower chamber 6 constituting the mould is of a rigid construction and may have the upper surface thereof contoured as a mirror image of the required shape of the produced composite. In one form, the wall 7 is rigidly attached about the perimeter thereof to the remainder of the chamber 6. In the alternative construction as depicted in large detail in fragmentary FIG. 1a, the wall 7 is attached to the peripheral wall of the chamber 6 by a flexible perimeteral membrane 10 to allow limited floating movement of the wall 7 with respect to the remainder of the chamber 6.

The wall 9, of the chamber 5 is of a non rigid construction, such as in the form of a membrane, the prime functions of which are to prevent the escape of pressurised fluid from the chamber 5, and to apply a uniform pressure over the adjacent surface of the composite supported on the wall 7 during the curing process. The resulting balanced pressure results in balanced forces as depicted in the drawing by the two arrows marked "A" and "B". As "A" is the equal and direct opposite of "B" the resultant force is zero. This means that there is no twisting or bending force on the mould 7 thus it need be no stronger than is needed to hold the composite in place accurately whilst the material is being laid in the mould. Once the composite is laid in the mould and the mould is closed, the flexible nature of wall 9 ensures the direct intimate contact between wall 9 and the laid up composite so that equal pressure is applied over the full extent of the composite. As is common practice in the production of composites, there is provided sheets of various materials layed up on one side of the composite lay-up. These may include a peel ply that promotes easy separation of the other layers of material from the cured composite, a bleed cloth to absorb excess resin and a breather cloth to absorb air the latter to promote the passage of the excess air to a suitable discharge location. These layers of material contribute to achieving the required thickness of the composite, and the complete expulsion of air and excess resin from within the composite and between the composite and the walls 7 and 9. The nature of the materials used in these various layers of material are well known to those in the composite industry.

Figure 2:
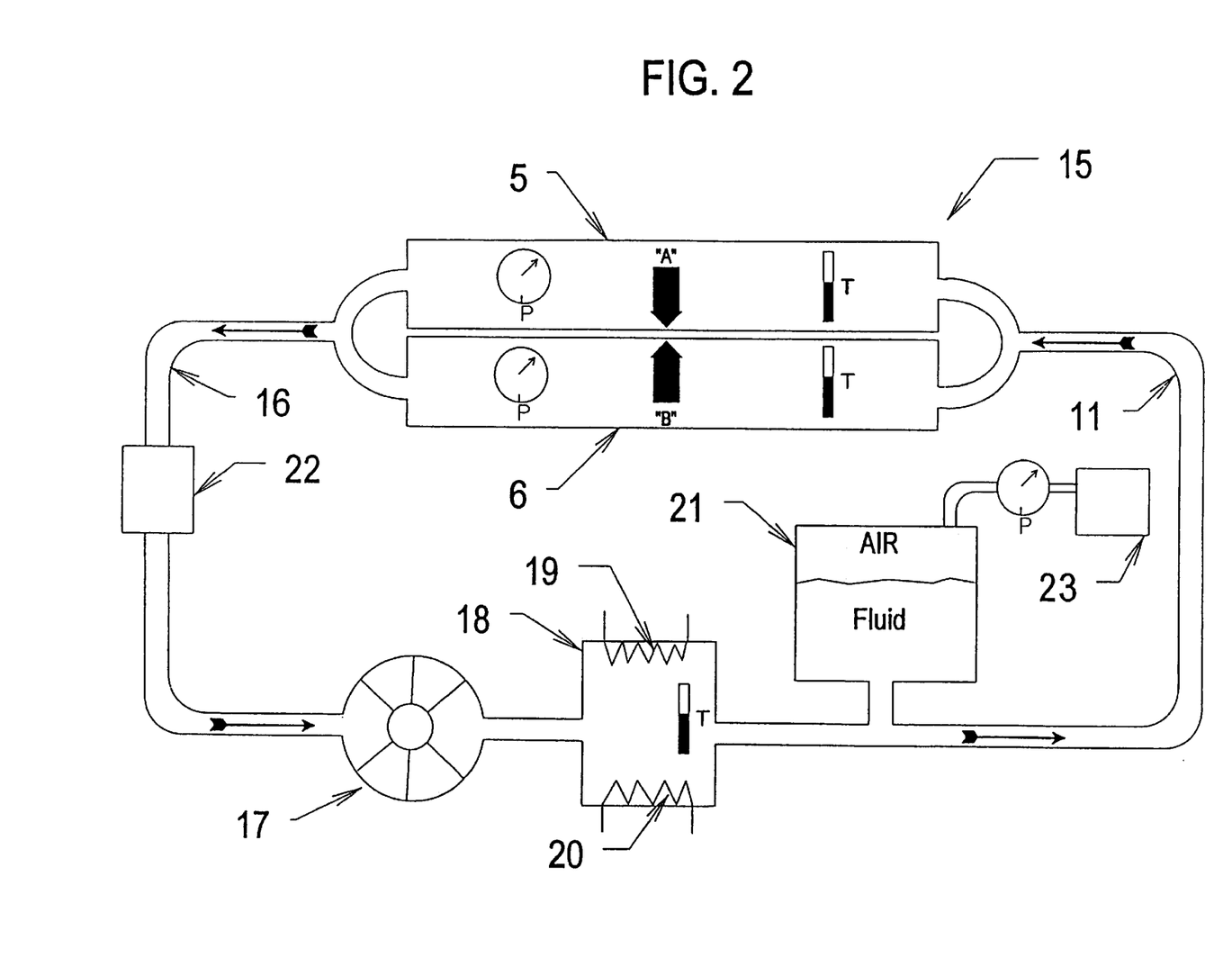
FIG. 2 is a diagrammatic representation of the moulding system in a closed loop configuration.

Referring now to FIG. 2 of the drawings, the two chamber mould assembly 15 is identical in construction to that described above with respect to FIG. 1, and shall not be further described with respect to FIG. 2. Each of the pressure chambers 5 and 6 are connected at one end to a delivery fluid conduit 11 and at the opposite end to a return fluid conduit 16. The conduits 11 and 16 are connected to the outlet and inlet respectively, or at multiple points in a large mould, to the circulation pump 17 which, during the curing of the composite, continuously circulates the pressurised fluid through the two chambers to maintain equal pressures and an even flow of heat energy therein.

In some moulds, particularly those of large surface area, a multiple number of pick-up locations may be connected to the single pump 17 or multiple pumps to achieve more uniform distribution of the fluid and equi-pressure over the area of the mould. It is preferred for the mould to be located on the vacuum or suction side of the pump so excess pressure can not build up in the mould and to assist the accurate maintenance of the desired pressure on the composite.

Between the delivery side of the pump 17 and the pressure chambers 5 and 6, there is provided a heat exchanger 18 which includes a heating element 19 to heat the fluid being circulated and preferably also a cooling element 20. A suitable temperature sensor is preferably provided within one or both of the pressure chambers 5 and 6, adjacent the mould walls thereof, so that the heat exchanger can be controlled to maintain the fluid being circulated through the pressure chambers 5 and 6 to the desired temperature and time profile. Also a pressure accumulator as indicated at 21 may be coupled with the fluid delivery line 11 to assist in maintaining the required pressure of the fluid in the pressure chambers 5 and 6. An air compressor 23 can be coupled to the accumulator to maintain the required pressure therein.

As an alternative to the incorporation of the heat exchanger 18, in the fluid delivery line 11, the line 11 may be coupled selectively to respective sources of hot and cold fluid, which can be regulated to maintain the temperature time profile of the fluid in the pressure chambers 5 and 6 at the required level.

In order to assist in compaction of the composite lay-up in the mould assembly 15, the vibration generator 22 is provided in the return conduit 16 to enable rapid vibration of the pressure of the fluid provided to the pressure chambers 5 and 6.

The structure of the composite can be of any desired combination of permeable material impregnated with resin, which are assembled in a stack formation. It is preferable to provide at least a conventional peel ply and as a final layer between the composite lay-up and the floating wall 9. The bleeder cloth absorbs the excess resin expelled from the composite lay-up, and allows the air within the composite lay-up to be expelled during the application of the pressure in the pressure chambers 5 and 6.

The method and system disclosed herein for the production of composites represents a substantial advance in the art as it reduces the required mechanical complexity and strength of the mould equipment including moulds, with resultant cost saving, simplifies the control of temperature and pressure, facilitates greater variation thereof for different composite compositions, reduces curing times and cycle times, and improves quality control.

Figure 3:
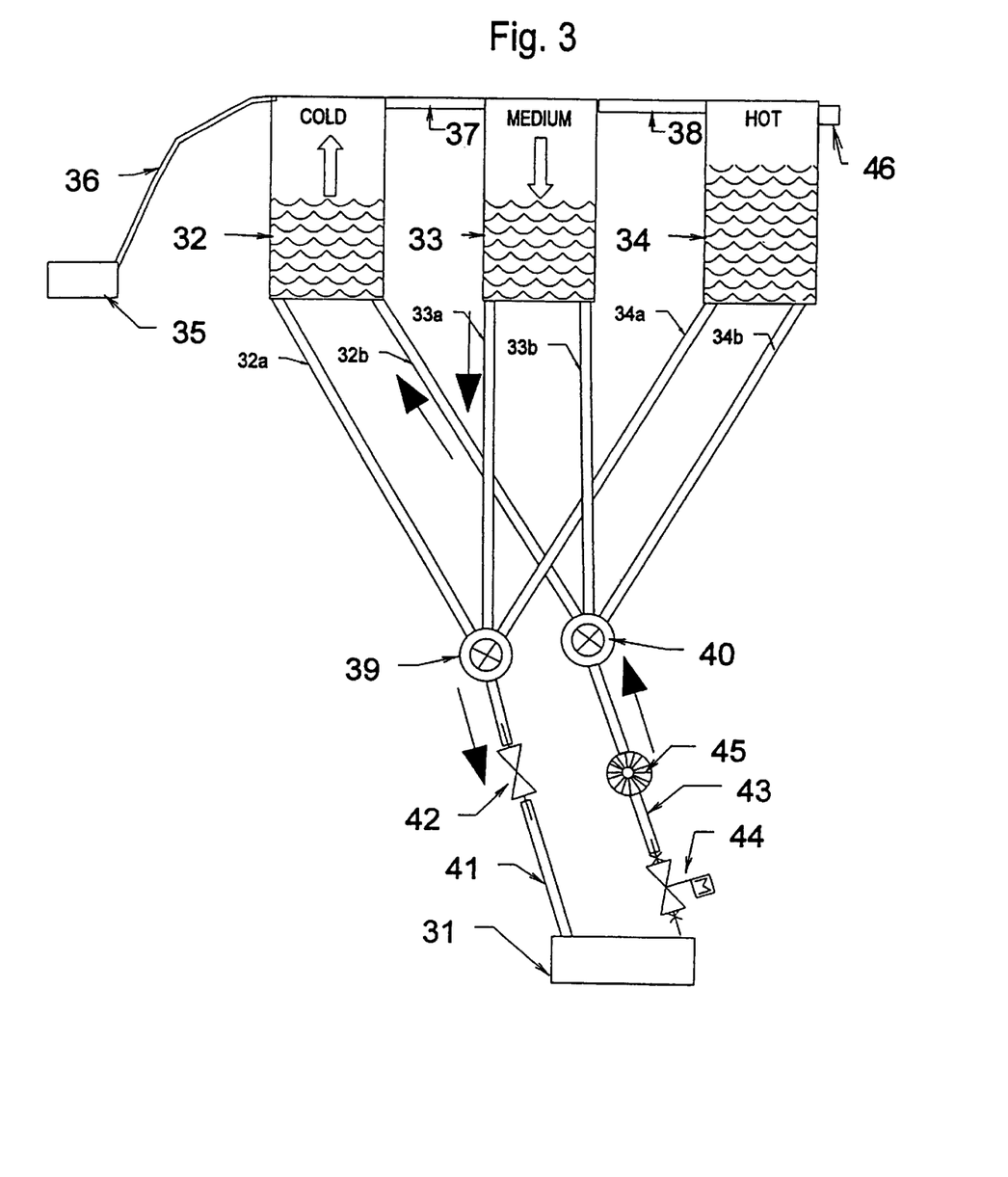
FIG. 3 is a diagrammatic layout of suitable water supply system for the mould in an open loop or external fluid source configuration.

There is shown diagrammatically in FIG. 3 a diagrammatic illustration of a water supply and return system for use in connection with the mould as previously described with respect to FIGS. 1 and 2, or with the mould to be subsequently described with respect to FIGS. 4 and 5. In FIG. 3, the mould is indicated diagrammatically at 31, and three water reservoirs are shown at 32, 33 and 34 respectively. A compressed air supply 35 is in communication with the reservoir 32 via the duct 36, and hence is in communication with the reservoirs 33 and 34 via the conduit 37 communicating reservoir 32 with reservoir 33 and the conduit 38 communicating reservoir 33 with 34. Each of the reservoirs are also in communication with a respective delivery and return duct numbered respectively, 32a, 33a, 34a and 32b, 33b and 34b. Each of the delivery return ducts 32a,33a and 34a are under the control of the three position return valve 39 whilst the return ducts 32b, 33b and 34b are under control of the three way return valve 40.

The three way delivery valve 39 is connected by a single duct 41 to the mould 31 to supply fluid, such as water, under pressure to the mould 31 from either one of the reservoirs 32, 33 or 34 as required under the control of the delivery valve 42. Similarly, the three way return valve 40 communicates with the mould 31 via the return duct 43 under the control of the return valves 40 and 44 and the pump 45 to any one of the reservoirs 32, 33 or 34. The return valve 44 is of the motorised type and constructed for cyclic operations so that the motorised valve 44 can be cyclically opened and closed, preferably at a variable frequency to create a water hammer effect in the mould 31 to contribute to the promotion of the removal of all air and excess resin from the mould. Normally the motorised valve 44 will be operated in the cyclic manner for a selected period immediately following the closing of the mould, when the initial compaction of the composite is being effected and prior to a significant degree of curing of the resin.

The three liquid reservoirs 32,33 and 34 are for the purpose of providing a source of cold, medium temperature and high temperature liquid for respective sequential circulation through the mould 31. The two control valves 39 and 40 are operated in combination so that the fluid is drawn from and returned to the same reservoir at any particular time in the curing cycle. However, the provision of the control valves 39 and 40 avoid the necessity to provide an individual pump and associated valve gear for each of the three reservoirs to be used respectively when the supply of fluid is required from any one of the three reservoirs. It will be appreciated that the valves 39 and 40 can be coupled so that they operate in unison or may be motor driven and controlled from an appropriate electrical switchboard or an electronic control unit, which control unit may be programmed to carry out the prescribed sequence of operations of the valves 39, 40, 42 and 44, and the operation of the pump 45, to control supply from and return to the respective reservoirs, fluid of the required temperature at the various stages in the curing process. The air duct 36 or one of the storage containers 32,33 or 34 is provided with a suitable pressure control valve 46 so as to safeguard against an accidental build up of air pressure in the system including the reservoirs 32,33 and 34 due to some malfunction.

The above described arrangement of the selective supply of liquid preferably water at three different temperatures enables significant savings in energy to be achieved. The circulation of the cold water through the mould 31 applies pressure to compress the composite lay-up and distribute the resin evenly throughout and expel the excess resin from the lay-up. The next stage is to circulate the medium temperature water through the mould, displace the cold water and return it to the reservoir 32 and thereafter circulate the medium temperature water to promote compaction of the lay-up. Subsequently the hot water reservoir is connected to the mould to initially return the medium temperature water to the reservoir 33 and thereafter circulate the hot water through the mould 31 to promote curing. This operating procedure can readily be achieved by appropriate selective operation of the valves 39 and 40 in combination and provides substantial savings in respect of the heat energy consumption of the system.

Figure 4:
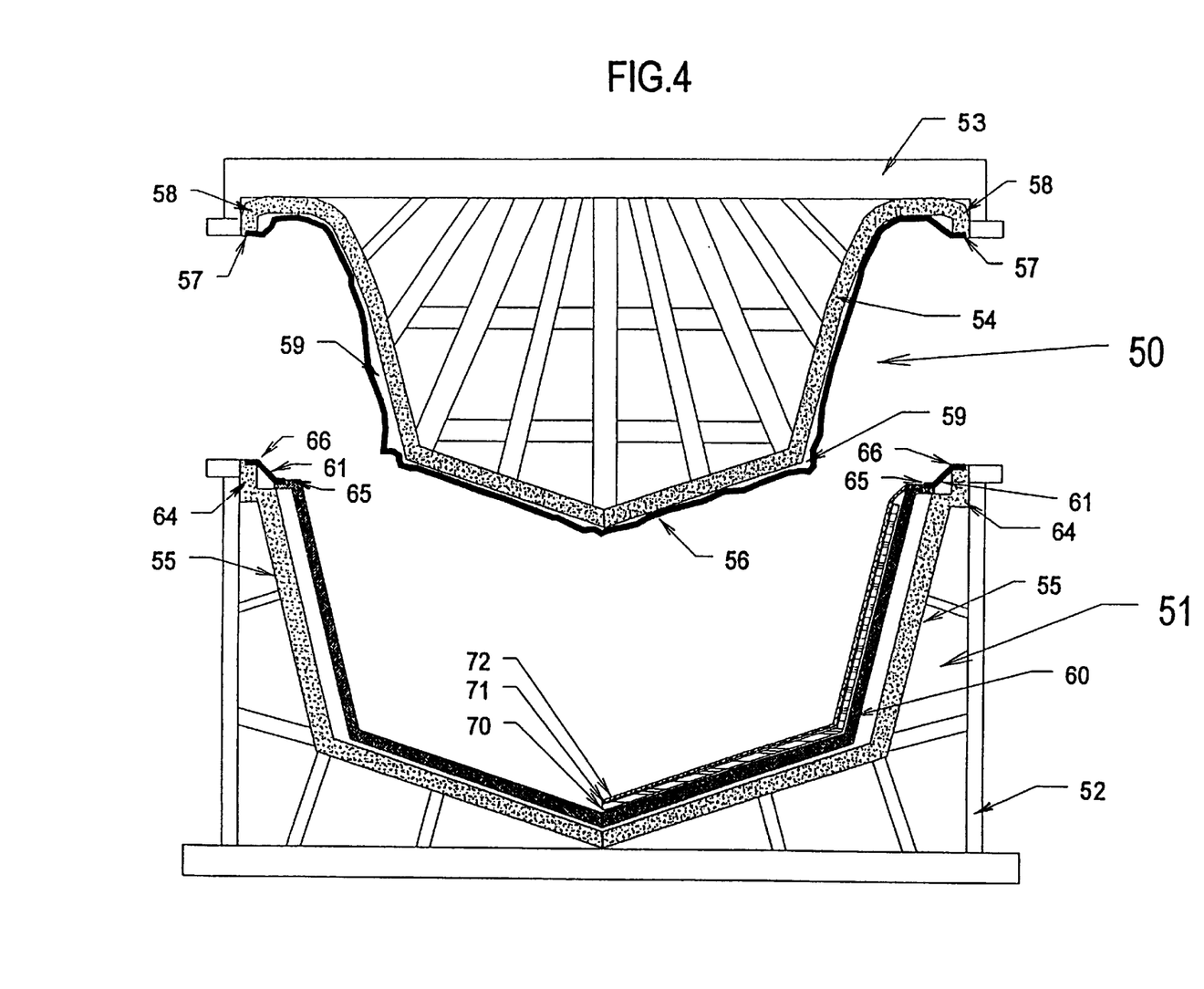
FIG. 4 is an exploded cross sectional view of a boat hull mould.

Referring now to FIG. 4 of the drawings, there is shown therein a cross sectional view through the upper and lower sections 50 and 51 of a mould assembly for the production of the hull of a boat. Each mould section comprises a respective frame structure 52 and 53 in which there is respectively supported rigid male and female pressure chambers 54 and 55, each of a cross sectional shape corresponding to the shape of the cross section of the hull at a particular location. The upper or male pressure chamber 54 also incorporates a flexible impervious liner 56 which is secured in a pressure tight relation along its complete perimeter 57 thereof to the perimeter portion 58 of the male pressure chamber 54. When in use, the cavity 59 formed between the wall of the male pressure chamber 54 and the flexible lining 56 is filled with the pressurised fluid, such as water, via a plurality of ducts suitably located along the length and width of the pressure chamber 54 to provide circulation of the fluid as previously described with reference to FIGS. 1 and 2.

The lower or female pressure chamber 55 includes a floating rigid mould element 60 having the internal surface thereof shaped and dimensioned to correspond precisely to the size and contour required on the exterior of the finished boat hull, and to provide with the male pressure chamber 54 a mould cavity as referred to further hereinafter. The upper peripheral edge portion 64 of the female pressure unit 55 is of substantially the same configuration as the shape of the perimeter portion 58 of the male pressure chamber 54. A flexible seal band 66 extends between the perimeter portion 65 of the floating rigid mould element 60, and the upper edge portion 64 of the female pressure chamber 55, along the complete periphery of each and is secured to each in a sealed manner with a free portion 61 of the flexible band 66 extending therebetween.

Figure 5:
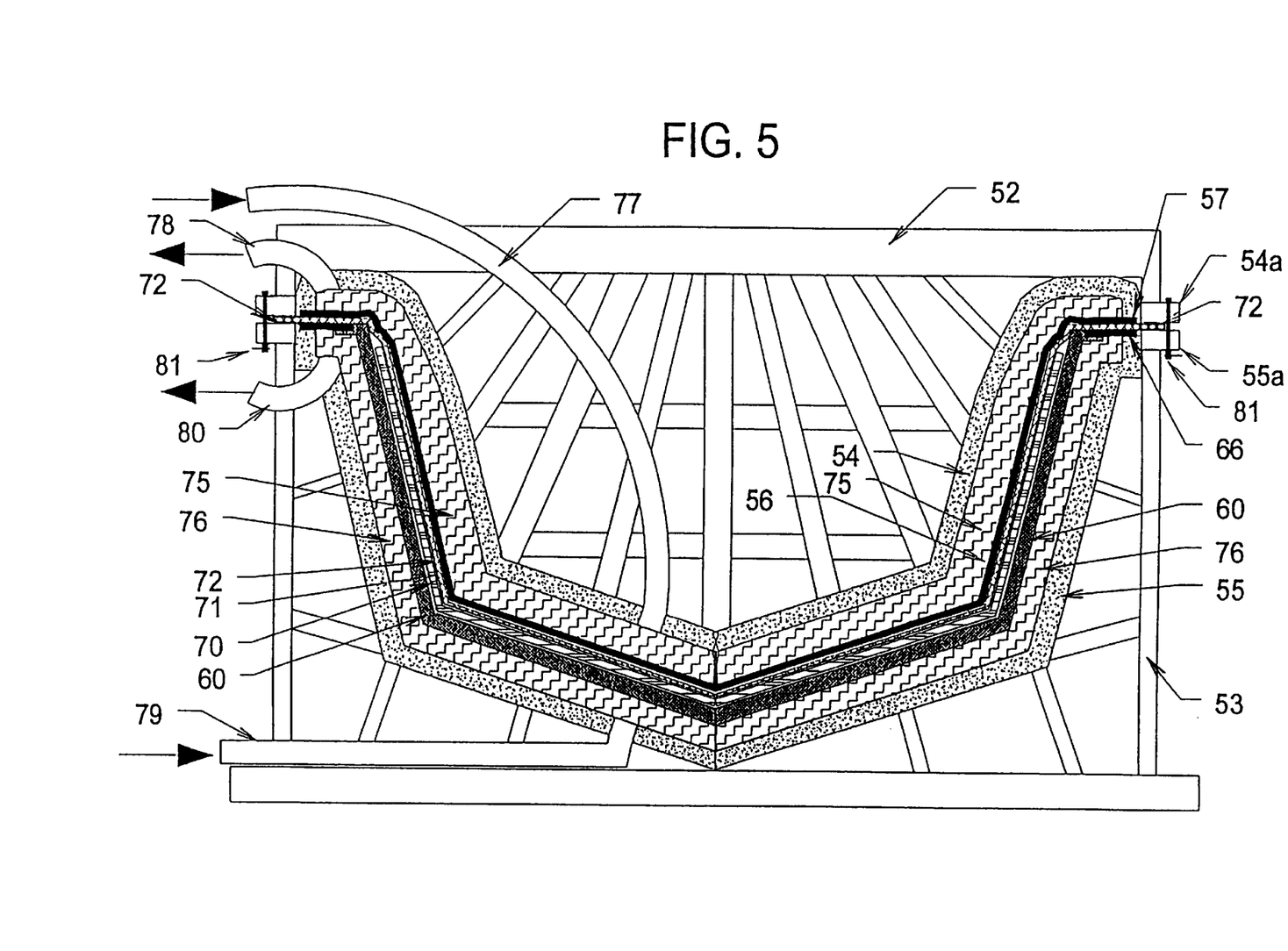
FIG. 5 is a diagrammatic cross sectional view of the mould shown in FIG. 4 in the operational configuration.

When the two pressure chambers 54 and 55 are brought together as shown in FIG. 5, the peripheral flanges 54a and 55a of the male and female pressure units 54 and 55 are in close proximity but not touching with the portion 57 of the liner 56 and the bleeder cloth 72 there between to permit discharge to atmosphere of excess air trapped between mould 60 and pressure wall 56, removed from the lay-up. A plurality of clamping devices such as bolts 81 (shown) are used to secure the flanges 54a and 55a together at spaced locations along the length thereof. When so assembled, a pressurised fluid, preferably liquid, is circulated through the respective cavities 75 and 76 formed respectively between the wall of the male pressure chamber 64 and the flexible liner 56, and the floating female mould element 60 and the outer shell of the female mould pressure chamber wall 55 so that the laid up assembly of the components of the composite to be formed are compressed therebetween as further discussed hereinafter.

As seen in FIG. 4, a representation of the composite lay-up is shown in the right hand side of the female mould, however it will be appreciated that normally the lay-up is continuous through both halves of the female mould. As shown, the lay-up consists of the resin impregnated fibrous material 70 which is in direct contact with the internal surface of the floating mould element 60, a peel cloth 71 and the bleeder cloth 72. Also as is customary, the surfaces of the mould are sprayed with a release material.

Following the closure of the mould with the lay-up between the male and female mould chambers 54 and 55, the fluid is circulated through the cavity 59 formed between the wall of the male mould 54 and the flexible lining 56, and also between the wall of the female mould 55 and the floating mould element 60 whereby the lay-up is caused to conform to the shape of the floating mould element 60 to take up the precise shape of the internal surface of the mould and the excess resin and air is squeezed out of the composite material into the bleed cloth. As seen in FIG. 4, the pressurised fluid is delivered into the male mould through a duct such as indicated at 77 and is discharged through a duct such as indicated at 78. It will be appreciated that a number of delivery and return ducts are provided throughout the mould with the deliveries being preferably in the lower area of the mould and the return through the upper area. Similarly, as shown by the ducts 79 and 80, the fluid is provided to the female mould and returned therefrom. The fluid is heated and cycled in a manner similar to that previously described with reference to FIGS. 1 and 2 of the drawings to ensure even pressure and all flow areas are easily purged of all air in the system.

I claim:

1. A method of manufacturing a composite component comprising locating a composite lay-up between a mould surface and a backing surface, each surface forming a wall of a respective pressure chamber, detachably securing the said chambers together to retain the lay-up enclosed between said mould and backing surfaces, each of the said walls being movable relative to the other under the influence of pressure in the respective chamber incorporating said wall and while the chambers are secured together to sandwich the composite therebetween, circulating fluid at an elevated temperature and pressure through each said chamber at substantially the same pressure to compress the composite lay-up between said mould and backup surfaces to compact said composite lay-up and elevate the temperature thereof to effect curing, wherein one of the movable walls between which the composite is located is of a flexible construction and the opposing surface of the other wall is shaped to impart to the composite a required surface contour.

2. A method as claimed in claim 1 wherein the pressure of the fluid circulated through the respective chambers is applied to substantially equal areas of the back up and mould surfaces so that the forces acting on the respective walls, between which the composite lay-up is located, are balanced.

3. A method as claimed in claim 1 wherein the other of the movable walls between which the composite is located is of a basic rigid construction connected around the complete periphery thereof to the remaining structure of the chamber to maintain a sealed relationship between the movable wall and the remainder of the chamber.

4. A method as claimed in claim 1 wherein while the composite is sandwiched between the mould and backup surfaces, the pressure in at least one of the respective chambers is subject to a pressure vibration.

5. A method as claimed in claim 1 wherein said walls forming the mould surface and the backing surface are each moved relative to the remainder of the respective chambers to compact the composite layer.

6. A method as claimed in claim 1 wherein the chamber wall forming the mould surface is a rigid wall and is moved relative to the remainder of the chamber in response to the application of the fluid pressure to said chamber.

7. A method as claimed in claim 1 wherein the chamber wall forming the backing surface is a flexible wall and is formed in response to the application of the fluid pressure to follow the shape of the rigid mould surface.

8. Apparatus for forming a composite component comprising two pressure chambers, one having a mould surface on one wall thereof and the other having a backing surface on one wall thereof whereby a composite lay-up can be disposed between said mould surface wall and the backing surface wall, means to detachably secure the chambers together with the mould and backing walls in opposing relation and the composite lay-up enclosed therebetween, each of said walls being arranged to move relative to the other under the influence of pressure in the chamber incorporating the respective wall and while the chambers are secured together to sandwich the composition therebetween, means to circulate fluid at an elevated temperature and pressure through said chambers to compress and cure a composite lay-up located between said chambers, the backing surface wall being of a flexible material, the mould surface wall being shaped to impart to the lay-up the required surface contour.

9. Apparatus as claimed in claim 8 wherein the wall of the chamber having the mould surface is rigid and secured to the remainder of the chamber by a flexible member for limited movement relative thereto under the influence of the pressure in the said chamber.

10. Apparatus as claimed in claim 8 including means to cyclically vary the pressure of the fluid circulated through at least one of the chambers.

11. A method as claimed in claim 1 wherein the pressure of the fluid circulated through the chambers is cyclically varied during at least part of the duration of application of pressure in the chambers.

12. Apparatus as claimed in claim 8 wherein two or more sources of fluid each at a respective temperature are available, and means are provided to selectively circulate fluid from any one of said sources through the chambers.

13. Apparatus as claimed in claim 8 wherein said fluid is a liquid.

14. Apparatus as claimed in claim 8 wherein the means to circulate fluid is a fluid pump and the pressure chambers are located at a suction side of the pump to thereby facilitate uniform pressurisation of the pressure chambers.

15. Apparatus according to claim 8 further including a vibration generating means for subjecting the pressure in at least one of the pressure chambers to a pressure vibration.

16. Apparatus for forming a composite component comprising two pressure chambers, one having a mould surface on one wall thereof and the other having a backing surface on one wall thereof whereby a composite lay-up can be disposed between said mould surface wall and the backing surface wall, said chambers being detachably secured together such that the mould and backing walls are in opposing relation to thereby accommodate a composite lay-up enclosed therebetween, each of said walls being arranged to move relative to the other under the influence of pressure in the chamber incorporating the respective wall and while the chambers are secured together to sandwich the composite therebetween, an elevated temperature and pressure fluid circulation system fluidly connected to said chambers, the backing surface wall being of a flexible material, the mould surface walls being shaped to impart to the lay-up the required surface contour, whereby circulation of the elevated temperature and pressure fluid through the chambers compresses and cures a composite lay-up located between the chambers.

17. The apparatus as claimed in claim 16 wherein the wall of the chamber having the mould surface is rigid and secured to the remainder of the chamber by a flexible member for limited movement relative thereto under the influence of the pressure in the respective chamber.

18. The apparatus as claimed in claim 16 wherein the fluid circulation system comprises a fluid pump and the pressure chambers are located at a suction side of the pump to thereby facilitate uniform pressurisation of the pressure chambers.

19. The apparatus according to claim 16 further including a fluid vibration generating mechanism in fluid communication with at least one of the pressure chambers.

* * * * *